United States Patent [19]
Cerny, Jr.
[11] 3,716,730
[45] Feb. 13, 1973

[54] INTERMODULATION REJECTION CAPABILITIES OF FIELD-EFFECT TRANSISTOR RADIO FREQUENCY AMPLIFIERS AND MIXERS

[75] Inventor: Frank J. Cerny, Jr., North Riverside, Ill.
[73] Assignee: Motorola, Inc., Franklin Park, Ill.
[22] Filed: April 19, 1971
[21] Appl. No.: 135,278

[52] U.S. Cl. ..................307/295, 307/304, 325/451, 330/35
[51] Int. Cl. ..........................................H03k 1/16
[58] Field of Search .330/35; 325/436, 451; 307/304, 307/295

[56] References Cited

UNITED STATES PATENTS

| | | | |
|---|---|---|---|
| 3,483,473 | 12/1969 | Lynk et al. | 330/35 UX |
| 3,348,154 | 10/1967 | Fish et al. | 325/451 |
| 3,513,405 | 5/1970 | Carlson | 330/35 X |
| 3,495,183 | 2/1970 | Doundoulakis et al. | 330/35 X |

OTHER PUBLICATIONS

Tamosaitis, "The Power Fet" Electronics World June 1969, pp. 34, 35, 82, 83.
Dennard, "Variation in Threshold Voltage Using Reduced Source-Drain Spacing" IBM Technical Disclosure Bulletin, Vol. 12, No. 9, Feb. 1970, p. 1391.

*Primary Examiner*—Roy Lake
*Assistant Examiner*—James B. Mullins
*Attorney*—Mueller & Aichele

[57] ABSTRACT

Mixers and amplifier circuits are disclosed which may include a plurality of identical FETs connected in parallel to form a composite FET. The decreased input impedance of the composite FET as compared to the input impedance of a single FET results in a decrease in intermodulation. The composite FET may also be a power or large signal FET. In either case, the pinch-off voltage of the composite FET can also be increased to provide a still further decrease in intermodulation.

9 Claims, 4 Drawing Figures

INVENTOR
FRANK J. CERNY
BY
Mueller & Aichele
ATTYS.

INTERMODULATION REJECTION CAPABILITIES OF FIELD-EFFECT TRANSISTOR RADIO FREQUENCY AMPLIFIERS AND MIXERS

BACKGROUND OF THE INVENTION

Electromagnetic signals within the frequency spectrum useful to radio communications are being utilized to fill an ever increasing number of important functions in our society. For example, many business operations which some years ago made no use of radio would now be seriously disrupted if this means of communication were taken away. Radio communication facilities are used increasingly more in police, safety, and transportation operations. Also, electromagnetic transmissions by an increased number of television and radio stations now provide information and enjoyment to more people than in the past.

Unfortunately, the resulting increased number of transmissions on different frequencies causes undesirable effects on radio communication. One such undesirable effect is intermodulation (IM) interference which occurs as two signals having first and second frequencies mix to produce at least a third signal having a third predetermined frequency. More specifically, as two off-channel signals, which may be transmissions by two different transmitters operating on different frequencies, combine in a nonlinear circuit of a receiver tuned to a third on-channel transmission, the two off-channel signals mix to provide a number of unwanted signals.

Mixing of the two off-channel signals might create products having frequencies equal to the sum of the frequencies of the two off-channel signals, the difference of the frequencies of the two off-channel signals, or the harmonics of the frequencies of the two off-channel signals. Still other frequency products are created by mixing in the receiver of the foregoing frequency products. One of these unwanted or IM products might be at the frequency of the third transmission. All circuits which include active elements, e.g., vacuum tubes, transistors, diodes, etc. have transfer characteristics which are to some extent nonlinear. The order of the nonlinearity determines in part the number, amplitude and frequencies of the IM components.

One method of reducing the amplitude of IM components is to increase the selectivity of the preselecting stages and the RF amplifiers preceding the mixer of the receiver. By increasing the amount of rejection to off-channel signals, the undesired signal strength available for intermodulation is reduced. There are, however, limitations on this approach. For instance, tuned circuits, or their equivalents, must be added in the front end of the receiver to increase selectivity. These circuits have insertion loss which lowers the sensitivity of the receiver.

Another method of reducing the amplitude of IM components is to utilize automatic gain control (AGC) to selectively control the sensitivity of the receiver. AGC action, which lowers the gain of the RF stages in proportion to the amplitude of the input signal also lowers the amplitude of the unwanted signals thereby reducing the amplitude of IM components. Utilization of increased selectivity and AGC action are, however, unsatisfactory methods of reducing IM in receivers which must select signals having very low levels.

The intermodulation products having the most deleterious effects on receiver performance are produced in the RF amplifier and mixer circuits. This is because IM produced by stages following the mixer stage can be reduced by increasing their selectivity. Of the two, the mixer usually produces IM components of the greatest amplitude because the signal level applied from the RF amplifier to the mixer is greater than the signal level applied from the antenna or preselector to the RF amplifier. To reduce IM in RF amplifiers and mixers, field-effect transistors (FETs) have been employed as the active devices because they can be biased for essentially square-law operation.

Prior art mixers utilize standard field-effect transistors having a pinch-off or cutoff voltage of no more than 8 volts and a drain saturation current of within the range from 4 to 20 milliamps. These mixers provide third-order IM rejection capabilities on the order of 85 db which is about 20 db (10 times) greater than the rejection capabilities of bipolar transistors. Although FET mixers having 85 db IM rejection are suitable for many applications, they may not be suitable in sensitive receivers operating in portions of the radio frequency spectrum where there are many relatively high power stations operating on closely adjacent frequencies. This condition occurs in the portion of the spectrum designated for commercial purposes. An expert in the field of communication receiver design has indicated that it is difficult to increase the IM rejection capabilities of mixers above that provided by a standard field-effect transistor.

Summary of the Invention

An object of this invention is to provide improved mixers and radio frequency amplifiers.

Another object of this invention is to provide solid state mixer or radio frequency amplifier circuits for use in sensitive communication receivers which provide an intermodulation rejection capability exceeding that provided by a mixer or a radio frequency amplifier employing a standard field-effect transistor.

Still another object of this invention is to provide a specially designed field-effect transistor which develops a predetermined amount of intermodulation rejection and which is suitable for use in either mixers or radio frequency amplifiers.

In brief, a preferred embodiment of a radio frequency amplifier or mixer having a high intermodulation rejection capability employs a specially designed large signal or power field-effect transistor which either has a low input impedance, a high gate pinch-off (or cutoff) voltage or a combination of these two qualities as compared to standard small signal or low power field-effect transistors. The low input impedance can be achieved by connecting a plurality of standard field-effect transistors in parallel in either a common source or a common gate configuration. Alternatively, a specially designed power or large signal field-effect transistor having a channel width which is greater than the comparable width of a standard field-effect transistor may be employed. By decreasing the input impedance of the FET, the amplitude of a reference signal developed at the input of the FET is decreased thus increasing the intermodulation rejection capability of the mixer or RF amplifier. In addition the pinch-off voltage can be increased by adjusting the relative doping levels of the gate and the drain-to-source channel.

DESCRIPTION OF THE PREFERRED EMBODIMENT

Figures 1, 2, 3, 4:
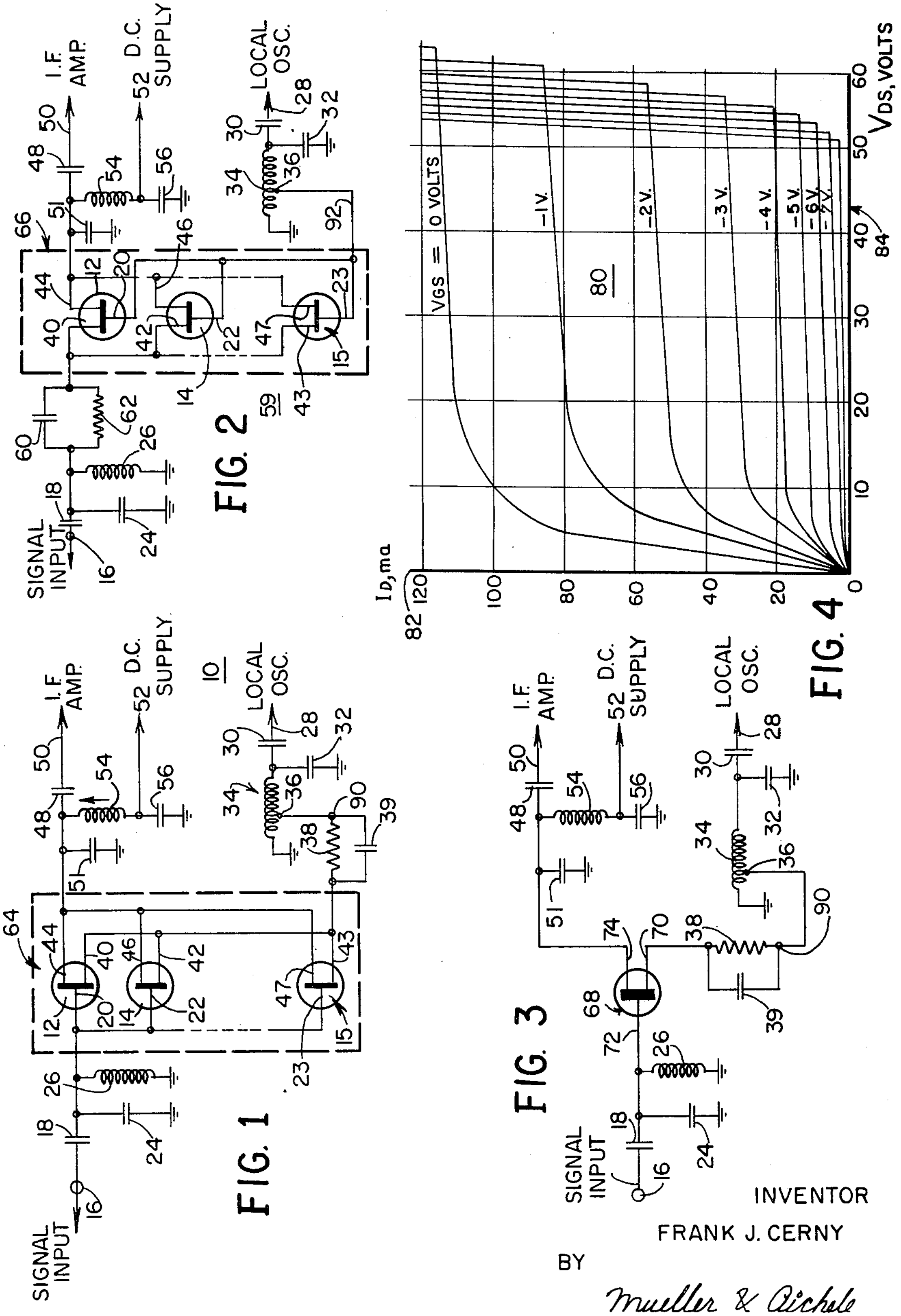
FIG. 1 is a schematic diagram of a mixer circuit employing a composite FET comprised of a plurality of FETs connected in parallel in a common source configuration.
FIG. 2 is a schematic diagram of a mixer circuit employing a composite FET comprised of a plurality of FETs connected in parallel in a common gate configuration.
FIG. 3 is a schematic diagram of a mixer circuit employing a FET having increased channel width as compared to a standard FET.
FIG. 4 shows a typical set of characteristic curves for the FET of FIG. 3.

Standard field-effect transistors (FETs) have been employed in the past in radio frequency amplifying and mixing circuits because of advantages inherent in the linear characteristics thereof. The design approach of the prior art has been to utilize standard or small signal, low power field-effect transistors in a carefully designed circuit configuration which has been optimized to take maximum advantage of the characteristics of the device rather than optimizing the device itself. A "standard" FET is defined as a FET having a gate pinch-off (or cutoff) voltage of no more than about 8 volts and a drain saturation current of from 4 to 20 ma. Apparently, the particular characteristics of the FET which contribute to intermodulation rejection capability have not been well understood. Mixers employing standard FETs have empirically determined intermodulation rejection capabilities within the range from 80 to 86 db.

The following mathematical derivation determines the approximate quantitative relationship between intermodulation rejection capability of a mixer employing a field-effect transistor, the gate pinch-off (or cutoff) voltage ($V_P$), the peak amplitude of the on-channel signal ($V_s$) used as a reference level for measuring IM and the second and fourth order Taylor's series coefficients of the transfer characteristic of the FET. After the equation for the IM of a mixer is derived, it will be employed to mathematically determine the theoretical intermodulation rejection capability of a standard FET which in so far as is known, heretofore was determined empirically. Then the significance of the equation with respect to the design of improved FET mixers will be explained. The results of a similar mathematical analysis applied to a FET utilized in a radio frequency amplifier and which determines the relationship between the IM rejection, the gate pinch-off voltage, the reference level and the first and third Taylor's series coefficients, is also disclosed and explained.

The circuit configuration employed in the "front end" or initial stage of a radio receiver depends on the desired characteristics of the receiver. Some superheterodyne receivers include RF amplifiers which couple an antenna or a preselector to the mixer and other receivers employ mixers connected directly to the antenna through a preselector or other passive frequency selecting network. Since selectivity can generally minimize the IM problem in the succeeding stages, the RF amplifier and mixer usually have the greatest effect on degrading the IM rejection of a superheterodyne receiver. If both a mixer and an RF amplifier are employed in a receiver, the mixer is usually the prime generator of IM components. The RF amplifier is less prone to IM because it receives lower level signals from the antenna or preselector than it delivers to the mixer. Moreover, the Taylor's series coefficients which indicate contribution to IM are generally slightly larger for a square-law biased mixer than for a linearly biased RF stage.

The IM products created by a FET mixer or amplifier are a result of nonlinearities therein. The transfer characteristic, the input junction and the source-to-drain channel may all contribute to the production of IM products in an amplifier or mixer including a FET. The undesirable effect of the gate-to-source or input junction of the FET on IM, for practical purposes, can be greatly reduced by controlling the amplitude of the input signal and biasing the FET so that the gate-to-source junction is never forward biased thereby. The undesirable effect of the source-to-drain channel on IM can be minimized by choosing the load for the mixer such that the load line drawn on the drain-to-source voltage versus drain current characteristic does not pass through the curved portions or knees thereof. The nonlinearity of the transfer characteristic is the contributor which is most difficult to deal with.

The transfer characteristic of any mixer or amplifier can be expressed in the form of an infinite Taylor's series $$y_2 = a_0 + a_1 x + a_2 x^2 + a_3 x^3 + a_4 x^4 + \ldots + a_n x^n \quad (1)$$

wherein:

$x$ = instantaneous input parameter $y_2$ = instantaneous output parameter $a_0, a_1, a_2 \ldots$ = Taylor's series coefficients The numerical values of the coefficients $a_0, a_1, a_2 \ldots a_n$ are functions of the device and its operating point. They can be determined from the transfer characteristic by using known computer techniques.

If two sinusoidal signals are applied to the input of a device wherein the $a_2$ and higher order coefficients have appreciable magnitude, various mixing products are produced at the output thereof. The frequencies and amplitudes of these products depend on the magnitudes of the various coefficients of equation 1. If the device is to be employed in a mixer, it should be biased near one-half $V_P$ to allow as high a conversion gain as possible. The peak-to-peak amplitude of the local oscillator may then approach the value of $V_P$ without causing the gate junction to conduct. The device may be biased closer to $V_P$ if the magnitude of coefficient $a_2$ relative to the magnitude of coefficient $a_4$ can be increased while still maintaining adequate conversion gain. The magnitudes of $a_4$ and other even coefficients should be as small as possible. Even though this is done the coefficients of the higher order terms corresponding to practical active devices, e.g., tubes, bipolar transistors, FETs, etc. still have definite values which generally decrease with the order of the term.

Since the conversion process of a mixer is dependent mainly upon the second order nonlinearity, a fourth order or higher even order nonlinearity is necessary for a third order intermodulation product to be created as a result of the mixer transfer function at the intermediate (IF) frequency. Since the fourth order term has a greater magnitude than any of the succeeding higher even order coefficients, it is the major contributor to IM in a mixer. The third order term is the greatest contributor to IM in an RF amplifier. An on-channel intermodulation product in a mixer is most likely to be produced by the fourth order nonlinearity when one off-channel signal $v_1$, at a first predetermined frequency space ($\Delta w$) away from the desired signal and another off-channel signal, $v_2$ at two times the predetermined frequency space away from the desired signal ($2\Delta w$) are simultaneously applied to the input of the mixer.

FETs are generally regarded as being square-law devices for purposes of analysis and design. If this simplification were true and a FET did provide a perfect square-law characteristic and had no reverse transfer function, it would not produce troublesome IM products when utilized in mixers. Characteristics of realizable diffusion type FETs are more nearly square-law than the characteristics of other active devices. The Taylor's series transfer characteristic for a FET may be represented by:

$$i_d = I_{DSS}\,[a_o + a_1 (v_{gs}/V_P) + a_2 (v_{gs}/V_P)^2 + a_3 (v_{gs}/V_P)^3 + \ldots + a_n (v_{gs}/V_P)^n] \quad (2)$$

wherein:

$i_d$ = instantaneous drain current $I_{DSS}$ = zero gate bias drain current, provided the drain-to-source voltage is greater than pinch-off $v_{gs}$ = instantaneous gate-to-source voltage $V_P$ = gate bias voltage necessary to achieve pinch-off (or cutoff). Coefficients $a_3$ to $a_n$ are not equal to 0 as with the idealized square-law case. The terms on the right hand side of the equal sign in equation 2 are normalized with respect to the gate pinch-off voltage.

Once a quiescent operating point is chosen for the FET, the Taylor's series may be expanded about this bias point.

$$i_d = I_{DSS}\,[\,b_o + b_1(v_{gs}'\ /V_P) + h_2(v_{gs}'\ /V_P)^2 + b_3(v_{gs}'\ /V_P)^3 + \ldots + b_n(v_{gs}'/V_P)^n] \quad (3)$$

wherein:

$v_{gs}' = v_s + v_o$ $v_s = V_s \cos w_s t$ = desired input signal voltage $v_o = V_o \cos w_o t$ = local oscillator voltage In equation 3, $b_o$, $b_1$, $b_2$ . . . are Taylor's series coefficients for the transfer characteristic expanded about the bias point. The $b_o$ term is quiescent DC current without local oscillator injection. All other even $b$ coefficients will contribute to the operating DC current.

Utilizing the normalized transfer function as expressed by equation 3, consider how an on-channel or intermediate frequency (IF) IM product is produced by the previously mentioned first undesired signal, $v_1$ at a predetermined radian frequency difference ($\Delta w$) from a desired or reference frequency $w_s$, and another undesired signal $v_2$ at two times that frequency difference ($2\Delta w$) from the desired frequency. In mathematical terms, the undesired or off-channel signals and the radian frequencies of the foregoing sentence may be expressed as follows:

$$w_1 = w_s \pm \Delta w \quad (4)$$

$$w_2 = w_s \pm 2\Delta w. \quad (5)$$

$$v_1 = V_1 \cos (W_s \pm \Delta w)t \quad (6)$$

$$v_2 = V_2 \cos (w_s \pm 2\Delta w)t \quad (7)$$

where all signs are the same, either positive or negative. The IF frequency, $w_{IF}$ is expressed as $$w_{IF} = |w_s - w_o|$$

where $w_o$ is the local oscillator frequency.

If the first undesired input signal, $v_1$ is squared and then multiplied by the second undesired input signal $v_2$, terms of the form $\cos [(2w_1 - w_2) - w_o]t$ result. Since $2w_1 - w_2 = w_s$ an unwanted signal has been produced which is reduced in the mixer to the intermediate frequency by subtracting the local oscillator signal therefrom. A fourth or other higher order even nonlinearity must exist for this process to occur in the mixer stage.

The output of the mixer in response to an on-channel or desired signal, $v_s$ is $$i_d = I_{DSS}\left[b_2\left(\frac{v_s+v_0}{V_P}\right)^2 + b_4\left(\frac{v_s+v_0}{V_P}\right)^4 + \ldots\right] \quad (8)$$

and the output from the two undesired IM-producing signals $v_1$ and $v_2$ is $$i_d = I_{DSS}\left[b_4\left(\frac{v_1+v_2+v_0}{V_P}\right)^4 + b_6\left(\frac{v_1+v_2+v_0}{V_P}\right)^6 + \ldots\right] \quad (9)$$

The on-channel IM product, produced by the two off-channel signals, $v_1$ and $v_2$, may be referenced to the on-channel reference signal, $v_s$ produced at the input of the FETs as follows:

$$b_2\left(\frac{v_s+v_0}{V_P}\right)^2 + b_4\left(\frac{v_s+v_0}{V_P}\right)^4 + \ldots = b_4\left(\frac{v_1+v_2+v_0}{V_P}\right)^4 + b_6\left(\frac{v_1+v_2+v_0}{V_P}\right) + \ldots \quad (10)$$

Equating on-channel products, which are derived by the use of trigonometric identities, yields $$\left[b_2 + \frac{3}{2}\,b_4\left(\frac{V_s^2+V_0^2}{V_P^2}\right) + \ldots\right]\frac{V_sV_0}{V_P^2}\cos|w_s-w_0|t = \left[\frac{3}{2}\,b_4 + \frac{15}{8}\,b_6\left(\frac{2V_1^2+3V_2^2+3_0^2}{V_P^2}\right) + \ldots\right]\frac{V_1^2V_2V_0}{V_P^4}\cos|(2w_1-w_2)-w_0|t \quad (11)$$

By previous definition, the frequency of the second off-channel signal $w_2$ subtracted from two times the frequency $w_1$ of the first off-channel signal is equal to the frequency $w_s$ of the on-channel signal. Therefore, the IF frequency, $|w_s - w_o|$ is equal to $|2w_1 - w_2 - w_o|$.

In general, each of the amplitudes of the on and off channel signals $V_s$, $V_1$, and $V_2$ is considerably less than unity, and the magnitudes of the Taylor's series coefficients decrease as the order increases, $b_2 \geq b_4 \geq b_6 \geq \ldots$. For the purpose of making IM measurements the amplitude, $V_1$ of the first off-channel signal is set equal to the amplitude $V_2$, of the second off-channel signal. Thus, to a first approximation equation 11 may be simplified to:

$$\left(b_2+\frac{3}{2}\,b_4\,\frac{V_0^2}{V_P^2}\right)\frac{V_s}{V_P}\cos|w_s-w_0|t = \left(\frac{3}{2}\,b_4+\frac{45}{8}\,b_6\,\frac{V_0^2}{V_P^2}\right)\frac{V_1^3}{V_P^3}\cos|w_s-w_0|t \qquad (12)$$

by letting $V_2 = V_1$.

The IM ratio is defined as the amplitude of the off-channel signal, $V_1$, as compared to the amplitude of the reference signal component, $V_s$ $$IM_{\text{mixer}}=\frac{V_1}{V_s}=\left[\frac{b_2+\frac{3}{2}\,b_4\,\frac{V_0^2}{V_P^2}}{\frac{3}{2}\,b_4+\frac{45}{8}\,b_6\,\frac{V_0^2}{V_P^2}}\right]^{1/3}\left(\frac{V_s}{V_P}\right)^{-2/3} \qquad (13)$$

The IM ratio expressed by equation 13 may be rewritten in a simplified form as:

$$IM_{\text{mixer}}=\left[\frac{\frac{2b_2}{3b_4}+\frac{V_0^2}{V_P^2}}{1+\frac{15}{4}\,\frac{b_6}{b_4}\,\frac{V_0^2}{V_P^2}}\right]^{1/3}\left(\frac{V_s}{V_P}\right)^{-2/3} \qquad (14)$$

If the Taylor's series coefficient $b_2$ is an order of magnitude larger than $b_4$, and $b_4$ is an order of magnitude larger than $b_6$ and so forth, equation 14 may be simplified to:

$$IM_{mixer} = (2\,b_2/3\,b_4)^{1/3}\,(V_s/V_P)^{-2/3} \qquad (15)$$

A similar analysis has been performed on a FET employed in an RF amplifier, wherein the third order and higher odd order nonlinearities tend to produce on-channel signals in response to the two off-channel signals, $v_1$ and $v_2$. The results of the analysis are expressed in the following relationship:

$$IM_{amp} = (4\,b_1/3\,b_3)^{1/3}\,(V_s/V_P)^{-2/3} \qquad (16)$$

To demonstrate the usefulness of equation 15 it will first be utilized to mathematically determine the intermodulation rejection capability of a mixer employing a FET. This type of determination, in the past, has been made empirically. The Taylor's series coefficients for the transfer characteristic of any FET can be evaluated by known numerical techniques. The coefficients for a particular, standard diffused field-effect transistor, which is biased at about half of the gate pinch-off value, $0.5V_P$, and which has a local oscillator signal of peak amplitude $0.5V_P$ applied thereto, are as follows: $b_0 = 0.280$; $b_1 = -0.918$; $b_2 = 0.70$; $b_3 = -0.10$; $b_4 = 0.16$. These coefficients change slightly for bias voltages of from $0.5V_P$ to $0.8V_P$ for a FET of a given type of construction, e.g., a diffused junction FET. For instance, the Taylor's series coefficients for the same FET biased $0.6V_P$ and having a local oscillator signal amplitude of $0.4V_P$ are as follows: $b_0 = 0.195$; $b_1 = -0.781$; $b_2 = 0.67$; $b_3 = -0.08$; $b_4 = 0.12$.

The theoretical IM of a mixer using the diffused FET may be calculated from the data above and the equations just derived. A 20 db quieting sensitivity of 0.2 microvolts (referred to 50 ohms) will be used for the reference level since the 2N4416 is capable of providing this performance as a mixer at highband. The pinch-off voltage range of this device is 2.5 to 6 volts (4 volts nominal). With the device biased near $0.6V_P$ the input resistance will be about 10,000 ohms. A driving source resistance of about 2,000 ohms will be used to obtain the optimum noise figure. Under these conditions, the peak reference voltage at the gate of the FET will be about $$V_s=2\sqrt{2}\,(.2uV)\sqrt{\frac{2000\omega}{50\omega}}\;\frac{10{,}000\omega}{(10{,}000+2000)\omega}=3.0uV \qquad (17)$$

since $$V_s=2\sqrt{2}\,V_{g_{rms}}\sqrt{\frac{R_s}{R_g}}\;\frac{R_i}{R_i+R'_s}$$

therefore, $$(V_s/V_P)^{-2/3} = (3\times10^{-6}/4)^{-2/3} = 1.21\times10^4.$$

The theoretical IM for a FET mixer employing a standard FET e.g., 2N4416, biased at $0.6V_P$ is then computed from equation 15 as follows:

$$IM_{mixer} = (2\,(0.67)/3\,(0.12))^{1/3}\,1.2\times10^4 = 1.9 = 10^4 = 85.5\text{ db} \qquad (18)$$

The computed IM of the mixer biased at $0.5V_P$ is 0.7 db lower.

Prior art field-effect transistor amplifiers and mixers have included standard, small signal or low power FETs which have pinch-off voltages of no more than 10 volts and drain saturation currents within the range from 4 to 20 milliamps. It is natural for designers to utilize small signal field-effect transistors in receiver front ends which handle only small signals: they are usually less expensive and take up less space than field-effect transistors designed for high power applications. In order for a device to function as a mixer or RF amplifier it must have significant gain at its frequencies of operation. Generally, in the past a great deal of effort has not been focused on the design of power field-effect transistors suitable for operation at high radio frequencies because it has been felt that bipolar radio frequency power transistors, for instance, would be able to provide more power gain in applications where such FETs would be employed, e.g., solid state transmitters. Since most available power FETs are low frequency devices they are not suitable for high frequency operation such as 100 to 500 MHz. Moreover, power or large signal field-effect transistors generally draw more current and require a higher supply voltage supply than lower power FETs.

In accordance with the discovery defined by equation 15, it is seen that the intermodulation rejection capability of a FET mixer is directly proportional to the gate pinch-off voltage and the magnitude of the second-order Taylor's series coefficient and inversely proportional to the amplitude of the reference signal and to the magnitude of the fourth-order Taylor's series coefficient. Furthermore, from equation 16 it is seen that the intermodulation rejection capability of a FET RF amplifier is directly proportional to the first-order Taylor's series coefficient, and to the gate pinch-off voltage and is inversely proportional to the third-order coefficient and the amplitude of the reference signal.

It can be concluded from equation 15 that the IM ratio is improved by 2 db each time either the signal reference amplitude, $V_s$, is decreased by 3 db or the gate pinch-off voltage of the device, $V_P$, is increased by 3 db. Therefore, by halving the input impedance of the FET the input signal reference voltage is reduced by 3 db and the IM ratio is improved by 2 db. This may be achieved by paralleling identical radio frequency FET devices as shown in FIGS. 1 and 2.

In FIG. 1 a mixer circuit 10 is disclosed which includes a plurality of identical radio frequency FETs 12, 14, 15, etc. which are connected in parallel in a common-source configuration, to form a "composite" FET. A preselector may be connected to first input terminal 16 so that the aforementioned desired or reference signal, $v_s$ is applied to the mixer. Capacitor 18 may be connected between input terminal 16 and a composite input terminal formed by gates 20, 22, 23, etc. for impedance matching purposes. A first parallel resonant circuit comprised of capacitor 24 and inductor 26 is connected from the gates to the reference potential. The output of a local oscillator is connected to second input terminal 28. Capacitor 30 couples the local oscillator signal across a second parallel resonant circuit comprised of the combination of capacitor 32 and inductor 34. The portion of the local oscillator signal developed at tap 36 of inductor 34 is connected through the parallel combination of resistor 38 and capacitor 39 to a second composite terminal formed by sources 40, 42, 43, etc. Resistor 38 determines the d.c. gate bias on the FET. Capacitor 39 is a short at all frequencies involved. The local oscillator signal signal and the input signal mix within the FETs to develop the IF signal at a composite output terminal formed by the connection of drains 44, 46, 47, etc. Capacitor 51 and inductor 54 form a parallel resonant circuit at the intermediate frequency. Capacitor 48 couples the IF signal to IF amplifier input terminal 50. IF resonating capacitor 51 is connected from the drain terminal to ground. The output of a power supply is connected to terminal 52 and the supply potential is connected through inductor 54 to drains 44, 46, 47, etc. Inductor 54 presents a high impedance to the IF signal thus tending to keep it from reaching the power supply. Bypass capacitor 56 presents a low impedance to ground for a portion of the IF signal being passed by inductor 54.

Because of the characteristic of FETs 12, 14, 15, etc., shown in FIG. 1, the source and gate circuits of the mixer should present a low impedance and the drain should present a high impedance at the IF frequency. Moreover, the gate circuit should have a low impedance at the local oscillator frequency. Otherwise, feedback through the FET might cause self-oscillation within the mixer. The above impedance requirements can be met by carefully choosing the values of the components and the tap on inductor 34 of the circuit of FIG. 1. Corresponding components of FIGS. 1, 2 and 3 are given the same reference numbers.

Mixer 59 of FIG. 2 is similar to the mixer of FIG. 1 except that FETs 12, 14, 15, etc. are connected in parallel in a common-gate configuration with sources 40, 42, 43, etc. forming a first composite input terminal, drains 44, 46, 47, etc. forming a composite output terminal and gates 20, 22, and 23 forming a second composite input terminal. Also, a parallel circuit comprised of capacitor 60 in parallel with resistor 62 is inserted in the signal path running from input terminal 16 to the sources 40, 42, 43, etc. of the FETs to provide d.c. gate bias for the FET.

If the identical FETs included in dotted box 64 of FIG. 1 or in dotted box 66 of FIG. 2 are considered to comprise a composite field-effect transistor, the drain saturation current, $I_{DSS}$ is equal to the saturation current of a single device multiplied by the number of devices. The gate pinch-off voltage of the composite FET is equal to the gate pinch-off voltage of a single device. The admittance or Y-parameters of the composite device are equal to the parameters of a single device multiplied by the number of FETs.

Referring to the transfer function of the composite device, as expressed by equation 3, each of the Taylor's series coefficients, designated by the $b_0$, $b_1$, $b_2 \ldots b_n$, will remain the same as that of a single device. However, the factor $I_{DSS}$ will increase $n$ times. Accordingly, the ratio of $b_2$ and $b_4$, as expressed in intermodulation rejection equation 15, is the same as for a single FET. Moreover, the gate pinch-off voltage, $V_P$ also is the same as for a single FET. However, the amplitude of the reference signal $V_s$, actually developed at the input of the composite device, is changed with respect to what it is for a single device being driven by a signal source having the same available driving power. This is because the input conductance of the composite device is $n$ times that of a single device. To achieve the same input power to the FET the driving source impedance must be reduced $n$ times, resulting in a reduction of $V_s$ by $\sqrt{n}$. Therefore, the intermodulation rejection is increased by connecting the FETs to form a composite FET, as shown in FIGS. 1 and 2.

Theoretically, the noise figure of the composite device will remain the same as that for a single FET if all driving and load impedances for the composite device are properly scaled by the ratio n. Also, if these impedances are so scaled, the actual gate voltage created in response to an input signal of given available power will be reduced $\sqrt{n}$ times and the composite mixer would provide the same effective sensitivity as a mixer including only a single FET.

From equation 15 it is concluded that the intermodulation rejection capability of the mixer as expressed in decibels ($IM_{db}$), and the amplitude of the reference signal $V_s$ are related as follows:

$$IM_{db} \, \alpha - \tfrac{2}{3} \left(V_{s_{\mathrm{db}}}\right) \qquad (19)$$

Therefore, each time $V_s$ is halved, while maintaining the same mixer performance, the intermodulation rejection capability is improved by 4 db. The reference signal amplitude, $V_s$, is halved if the input impedance is divided by four. Thus, the intermodulation rejection improves 2 db each time the number of FETs, $n$, is doubled. The immediately foregoing prediction has been verified by experiments utilizing composite FET devices which were fabricated to be equivalent to a plurality of standard high-frequency field-effect transistors (type 2N4416) connected in parallel. Experimental results which were obtained for composite devices equivalent to 2, 4, and 8 standard FETs connected in parallel, are summarized in the following table:

| Number of FETs (2N4416) | IM for typical $I_{DSS}$ | Typical $I_{DSS}$ | $I_{DSS}$ Range |
|---|---|---|---|
| N = *1 | **84 db** | **10 ma** | **5 to 15 ma** |
| **2** | **86 db** | **20 ma** | **10 to 30 ma** |
| **4** | **88 db** | **40 ma** | **20 to 60 ma** |
| **8** | **90 db** | **80 ma** | **40 to 120 ma** |

*Standard FET mixer

As shown by equation 15, the IM rejection capability can also be increased by increasing the gate pinch-off voltage, $V_P$, which is known to be a function of the doping levels of the gate and the drain-to-source channel. Increasing the doping level of the drain-to-source channel will increase both the gate pinch-off voltage and the drain saturation current. The gate is generally very heavily doped with respect to the channel, and further doping increases will not appreciably affect the pinch-off voltage and drain saturation current as compared to doping level changes in the channel. For a given family of devices of a given structure the drain saturation current, $I_{DSS}$, is nearly proportional to the square of the gate pinchff voltage. Thus, either increase in channel width, or adjustment of doping or both increases the IM rejection because of the increase in gate pinch-off voltage and/or drain saturation current. Each of the FETs of composite FET devices 64 and 66 of FIGS. 1 and 2, respectively could have increased gate pinch-off voltages with respect to the standard FET which would result in a further decrease in intermodulation. The above concepts for increasing IM rejection apply to junction and insulated gate FETs with either one or two gates.

The improvement in IM rejection achieved by using parallel devices, as shown in FIGS. 1 and 2, can also be achieved by using a single device having an increased channel width or increased gate pinch-off voltage or both. FIG. 3 discloses a mixer circuit similar to the circuit of FIG. 1 but which utilizes a composite power or large-signal radio frequency FET 68 (such as the Motorola experimental SL–820) which has an increased channel width and an increased gate pinch-off voltage in accordance with the teaching of the present invention. The channel width of this device is 126 thousandths of an inch as compared to a width of 24 thousandths of an inch for a 2N4416. FET 68 has a source terminal 70, gate terminal 72 and drain terminal 74. FIG. 4 is a set of characteristic curves 80 for power FET 68 of FIG. 3. These curves relate the drain current $I_D$ (axis 82) to the drain-to-source voltage, $V_{DS}$ (axis 84) for particular values of gate-to-source voltage $V_{gs}$.

The SL–820 has a saturation current, $I_{DSS}$, on the order of 110 milliamps as compared to a standard 2N4416 FET which has a typical saturation current of about 11 milliamps. Therefore, the power field-effect transistor 68 has Y-parameters similar to a composite device formed by about 10 2N4416 devices connected in parallel. Thus, considering only the signal reference amplitude change, $V_s$, at input 16 of FIG. 3, the intermodulation rejection of a mixer employing the SL–820 should be 6.7 db greater than the intermodulation rejection of a mixer employing one 2N4416. Furthermore, the pinch-off voltage of the SL–820 is about 1.95 times that of a 2N4416. Considering only the increased pinch-off voltage, the intermodulation rejection of a mixer employing the SL–820 should be 3.8 db greater than intermodulation rejection of a mixer employing one 2N4416. Therefore, the total IM rejection resulting from using a device similar to the Motorola SL–820 is 10.5 db or over 10 times the IM rejection afforded by a standard FET. The typical IM of this device as a mixer at both 200 and 500 MHz has measured 96 to 98 db.

As shown by equation 16, the IM rejection capability of an RF amplifier including a FET is likewise proportional to the gate pinch-off voltage $V_P$ and inversely proportional to the amplitude of the reference signal $V_s$. Therefore, the foregoing statements relating to the IM rejection capability of mixers including FETs is also generally applicable to the IM rejection capabilities of RF amplifiers including FETs. More specifically, by connecting point 90 of circuit 10 of FIG. 1 to a ground or reference potential, rather than to the output of the local oscillator, circuit 10 is converted into an RF amplifier which amplifies input signals impressed between the composite gate terminals connected to electrodes 20, 22 and 23 and a reference or ground potential to provide an output signal at drains 44, 46 and 47. The Taylor's series coefficients $b_1$ and $b_3$ of composite FET 64, as expressed in equation 16, are again the same as those for a single FET. Accordingly, the ratio of $b_1$ to $b_3$, as expressed in IM rejection equation 17, is the same as for a single FET. However, the amplitude of the reference signal, $V_s$, developed at the input of the composite device is decreased as compared to what it would be for a single device as previously described. Thus, each time the number of FETs is doubled, the IM rejection capability of the RF amplifier also increases because of the resulting decrease in input impedance and reference signal amplitude. A similar effect is also produced by employing FET 68 which has a drain-to-source channel of increased width. Moreover, an increase in the gate pinch-off voltages of each of the plurality of FETs or of the composite FET increases the IM rejection capability of the RF amplifier. The mixer of FIG. 2 is converted into an RF amplifier by grounding point 92, and the mixer of FIG. 3 is converted into an RF amplifier by grounding point 90.

What has been described, therefore, is an improved mixer of RF amplifier circuit configuration employing either a plurality of field-effect transistors or a single specially designed radiofrequency power FET to provide increased intermodulation rejection capability without sacrificing other pertinent specifications such as the noise figure, power gain, or sensitivity.

I claim:

1. A radio frequency mixer suitable for use in a communications receiver and developing a desired output signal of a frequency which is a function of the frequency of a desired small amplitude input signal and of the frequency of a mixing signal, the radio frequency mixer tending to prevent intermodulation between undesired input signals and including in combination:

field-effect transistor means having a source-to-drain semiconductor structure with source and drain terminals electrically connected thereto and a gate structure with a gate terminal electrically connected thereto, said source-to-drain structure having selected dimensions and doping which causes the gate pinch-off voltage of said field-effect transistor means to be at least 20% greater than the pinch-off voltage of a standard, small signal field-effect transistor, said field-effect transistor means reducing the magnitude of the current through said source-to-drain structure and between said source and drain terminals to substantially zero in response to a reverse bias voltage applied between said gate and source terminals equal to said increased gate pinch-off voltage;

first signal supply means having a first output terminal connected to said gate terminal and a second output terminal, first circuit means connecting said second output terminal to said source terminal, said first signal supply means providing to said gate terminal the desired input signal having a particular frequency which may be accompanied by undesired input signals having other frequencies which differ from said particular frequency;

second signal supply means having a first output terminal connected to said source terminal and a second output terminal, second circuit means connecting said second output terminal of said second signal supply means to said gate terminal, said second signal supply means developing the mixing signal of a predetermined frequency which is different from said particular frequency of the desired input signal across said gate and source terminals;

said gate structure and said source-to-drain structure of said field-effect transistor means being responsive to said desired input signal and said mixing signal to produce the desired output signal in said source-to-drain structure which has a frequency that is a function of the frequencies of the desired input signal and the mixing signal, said undesired signals tending to intermodulate within said structure of said field-effect transistor means to provide an undesired intermodulation signal at the frequency of the desired output signal; and said source-to-drain structure and said gate structure of said field-effect transistor means cooperating to hold the magnitude of said undesired intermodulation signal at a reduced magnitude as a result of said increased pinch-off voltage as compared to the magnitude of an undesired intermodulation signal provided by a standard, small signal field-effect transistor operating under the same conditions.

2. The field-effect transistor radio frequency mixer of claim 1 wherein said source-to-drain structure is constructed to allow a source-to-drain current in excess of 50 milliamperes to flow between said source and drain terminals in response to source-to-drain voltages in excess of said gate pinch-off voltage and to said gate terminal being shorted to said source terminal to further decrease the magnitude of said undesired intermodulation signal.

3. The field-effect radio frequency mixer stage of claim 2 wherein said source-to-drain structure provides a channel having an effective width on the order of 126 thousandths of an inch, said channel conducting substantially greater source-to-drain current than a standard small signal field-effect transistor to thereby facilitate intermodulation rejections on the order of 90 decibels.

4. The radio frequency mixer of claim 1 wherein said field-effect transistor means includes at least one field-effect transistor having a gate pinch-off voltage in excess of 10 volts.

5. The radio frequency mixer of claim 4 wherein said field-effect transistor means includes a plurality of said field-effect transistors each having said gate pinch-off voltage in excess of 10 volts connected in parallel.

6. The radio frequency mixer of claim 5 wherein said plurality of field-effect transistors are connected in parallel in a common-source configuration.

7. The radio frequency mixer of claim 5 wherein said plurality of field-effect transistors are connected in parallel in a common-gate configuration.

8. A radio frequency mixer suitable for use in a communications receiver and developing a desired output signal of a frequency which is a function of the frequency of a desired small amplitude input signal and of the frequency of a mixing signal, the radio frequency mixer providing a high rejection of intermodulation between undesired input signals and including in combination:

field-effect transistor means having a source-to-drain semiconductor structure with source and drain terminals electrically connected thereto and a gate structure with a gate terminal electrically connected thereto, said source-to-drain structure having selected dimensions and doping which establish a gate pinch-off voltage and which allow a source-to-drain current in excess of 50 milliamperes to flow between said source and drain terminals in response to source-to-drain voltages in excess of said gate pinch-off voltage;

first signal supply means having a first output terminal connected to said gate terminal and a second output terminal, first circuit means connecting said second output terminal to said source terminal, said first signal supply means providing to said gate terminal the desired input signal having a particular frequency which may be accompanied by undesired input signals having other frequencies which differ from said particular frequency;

second signal supply means having a first output terminal connected to said source terminal and a second output terminal, second circuit means connecting said second output terminal of said second signal supply means to said gate terminal, said second signal supply means developing the mixing signal of a predetermined frequency which is different from said particular frequency of the desired input signal across said gate and source terminals;

said gate structure and said source-to-drain structure of said field-effect transistor means being responsive to said desired input signal and said mixing signal to produce the desired output signal in said source-to-drain structure which has a frequency that is a function of the frequencies of the desired input signal and the mixing signal, said undesired signals tending to intermodulate within said structure of said field-effect transistor means to provide an undesired intermodulation signal at the frequency of the desired output signal; and said source-to-drain structure and said gate structure of said field-effect transistor means cooperating to decrease the magnitude of said undesired intermodulation signal as a result of said selected dimensions and doping.

9. The radio frequency mixer of claim 8 wherein said pinch-off voltage is on the order of 20 percent greater than the pinch-off voltage of a standard small signal field-effect transistor suitable for use in a communication receiver.

* * * * *